United States Patent [19]

Hoener et al.

[11] 4,395,172
[45] Jul. 26, 1983

[54] CARGO RESTRAINT SYSTEM WITH SPRING FUSE

[75] Inventors: Dieter W. Hoener, Bellevue; Neville L. Lambert, Seattle; Erwin V. Schweizer, Kent, all of Wash.

[73] Assignee: The Boeing Company, Seattle, Wash.

[21] Appl. No.: 215,613

[22] Filed: Dec. 12, 1980

[51] Int. Cl.³ .............................................. B64D 1/10
[52] U.S. Cl. ................................. 410/84; 244/118.1; 244/137 R; 410/92
[58] Field of Search ............ 244/118.1, 137 R, 138 R; 410/69, 77, 79, 84, 85, 89, 92, 105

[56] References Cited

U.S. PATENT DOCUMENTS

| | | | |
|---|---|---|---|
| 3,182,608 | 5/1965 | Mollon | 410/92 X |
| 3,335,983 | 8/1967 | Mollon et al. | 244/137 R |
| 3,424,410 | 1/1969 | Galaup | 244/137 R |
| 4,241,890 | 12/1980 | Pearson | 244/137 R |

*Primary Examiner*—Randolph Reese
*Attorney, Agent, or Firm*—Ronald E. Suter; Bernard A. Donahue

[57] ABSTRACT

A cargo restraint and delivery system for an aircraft having a cargo-receiving and delivery opening for cargo secured to pallets. The cargo is moved backwardly and out of the rear cargo-delivery opening under either the pull of the parachute when the aircraft is airborne or by the force developed by the rapid acceleration of the aircraft for combat off-loading of cargo onto the ground. One of two spaced-apart guide rails for the pallets supports locks to releasably hold the pallets. A logistics control includes a lever at a loadmaster station to move a logistics control cable extending along the rail supporting the locks to move them into a first position where the pallet locks will release the pallets for movement either forward or aft of the aircraft and a second position where the pallet locks will prevent either forward or aft movement of a pallet. A system of levers coupled to each of the locks is controlled by a chain system extending to the loadmaster station and operation on cam members to sequentially actuate each system of levers. The levers move the pallet locks into a third position wherein the locks will prevent forward movement of a pallet but will permit aft movement of a pallet against a biasing force of a spring acting on the lever system thereof. The control for the pallet locks is mounted below the floor of an aircraft and the guide rails are mounted to pivot the troughs to form a flush relation with the floor of the aircraft.

11 Claims, 10 Drawing Figures

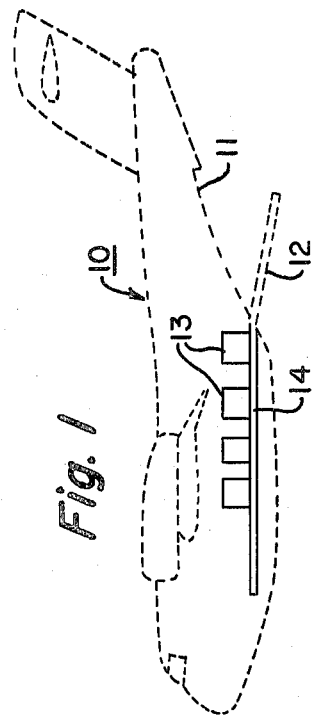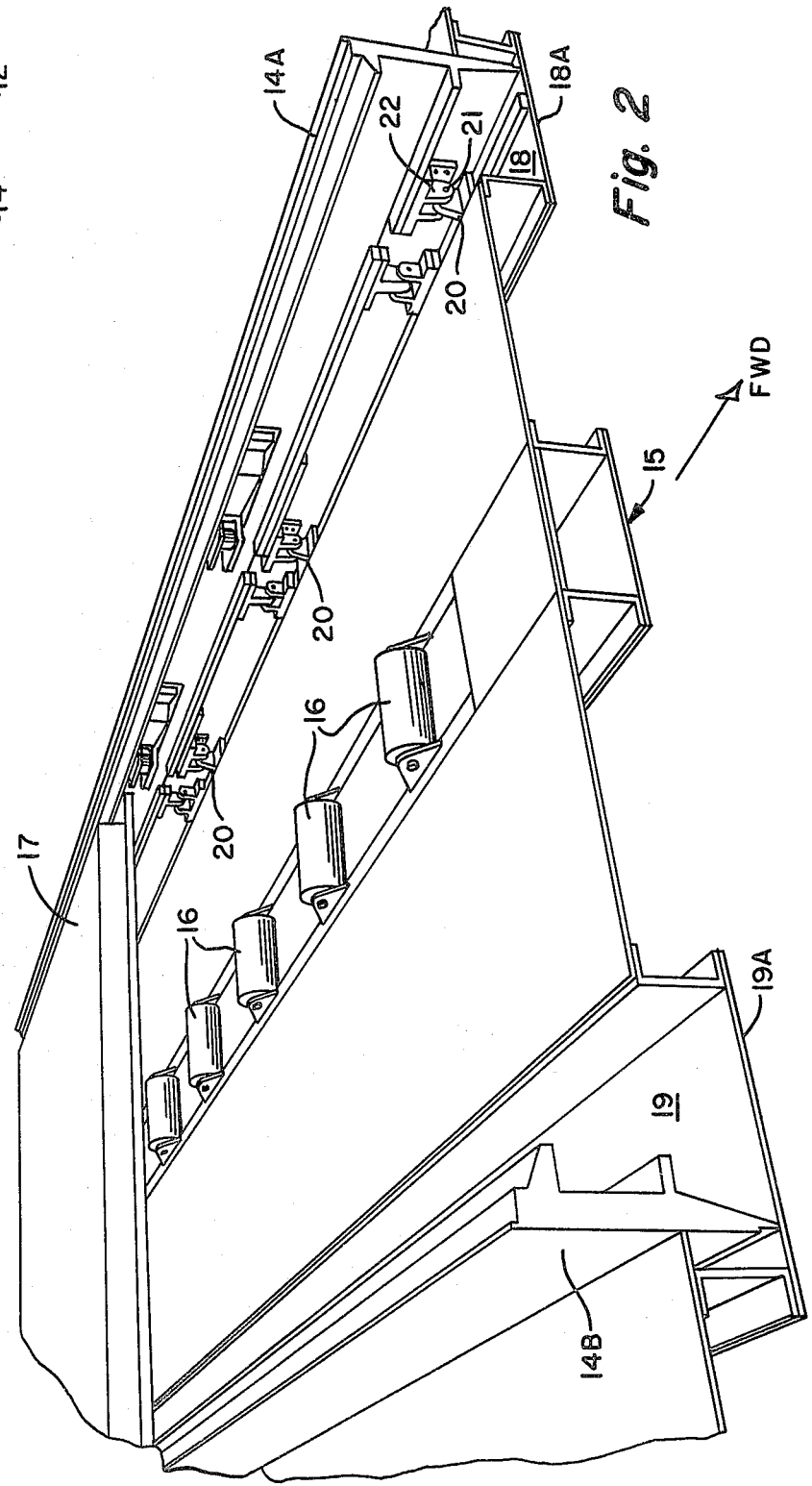

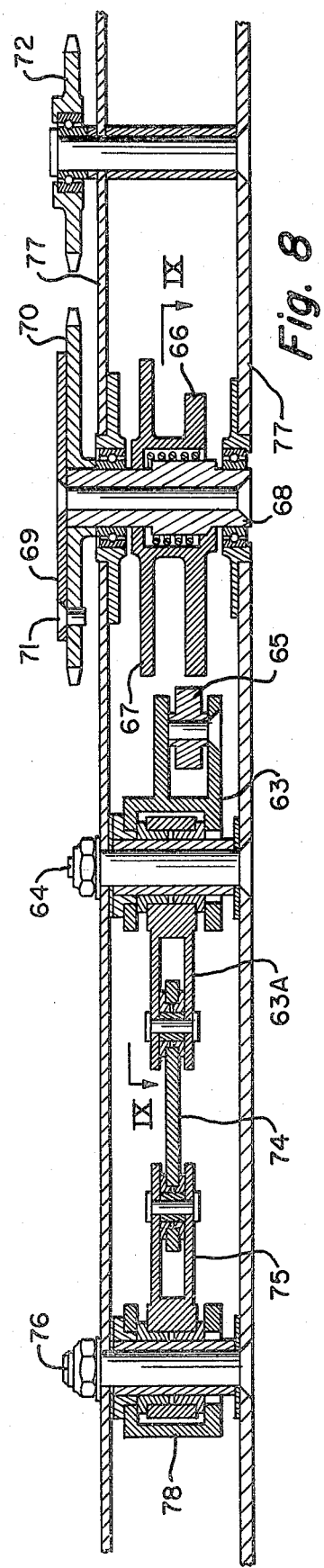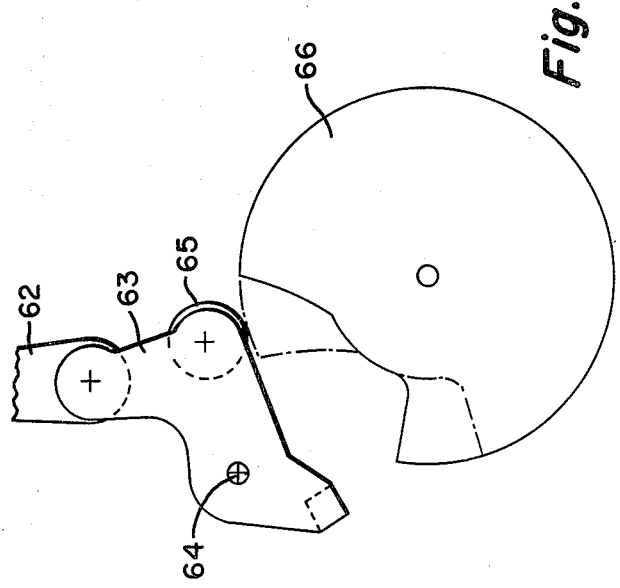

CARGO RESTRAINT SYSTEM WITH SPRING FUSE

BACKGROUND OF THE INVENTION

This invention relates to a cargo restraint and delivery system having a simultaneous control used for logistics and a sequential control used for combat off-loading and aerial delivery where, in the latter instance, a load-sensing mechanism including a spring fuse operates in the system for the delivery of cargo.

Cargo drops by parachute from an aircraft have been extensively employed in military operations and disaster relief situations. In the usual parachute cargo delivery system, pallets loaded with cargo are guided for movement along the longitudinal axis of the aircraft between parallel rails secured to the aircraft floor. The force developed by a deployed parachute is used to pull the cargo backwardly out of the rear cargo-receiving and delivery opening in the aircraft. Desirably, the aircraft must also be capable of discharging cargo onto the ground while the aircraft accelerates over the ground surface.

In the prior art cargo delivery systems, one of the two restraint rails used to guide the cargo pallets is provided with aerial delivery locks that permit only aft movement of a pallet under the force exerted by a parachute. Logistic locks are carried on the other rail to prevent both forward and aft movements of the cargo during normal flight conditions. In the aerial delivery mode of operation, the logistic locks on one rail are all disengaged while the aerial delivery locks on the other rail provide all forward and aft restraints for the cargo. If it is necessary to return to a logistically-locked status, then manual reengagement of the logistic locks must be undertaken. This reengagement of the logistic lock may be very difficult due to a misalignment between slots in the cargo pallets and the logistic locks should the pallets shift slightly. Furthermore, prior art systems wherein locks are used on both rails are heavy, complex and generally unreliable.

One form of aerial delivery system intended to overcome these disadvantages is disclosed in U.S. application Ser. No. 92,146, now U.S. Pat. No. 4,241,890 issued Dec. 30, 1980 assigned to the assignee of this invention. In this aerial delivery system, all of the pallet locks are carried on one guide rail and controlled by a single control rod extending to a loadmaster station. The function of the pallet locks is combined for both the aerial delivery system and logistics. Each lock for a pallet never has to disengage from the load unless the cargo is actually unloaded. A bending fuse is used to restrain a pallet in its proper position until a minimum predetermined load is applied to the pallet by an extended parachute. At this moment, the fuse fails in bending, allowing the pallet to be dragged out of the rear cargo-delivery opening by the parachute. The failure point of the fuse is chosen by a selected characteristic of the metal used to fabricate the fuse to vary tolerances of the fuse. However, unnecessary logistics are required to provide aircraft with fuses which are especially undesirable during warfare. The replacement of a set of ruptured fuses after an aerial cargo delivery operation requires time and expense that are eliminated by the system of the present invention. Moreover, on present military aircraft, cargo-restraining rails and operating mechanism therefor are installed and removed from the aircraft as utilization requires. Recent requirements for cargo handling provide that cargo restraint rails and operating mechanism therefor are to be a permanent part of the aircraft rather than a kit which is used only when needed. The space available on recent aircraft, such as the C14, is not sufficient to use the arrangement of cargo rails with cargo restraint locks presently used on aircraft.

SUMMARY OF THE INVENTION

In accordance with the present invention, the disadvantages of prior art cargo restraint lock systems for cargo pallets are overcome by installing the cargo restraint lock in one of the two cargo rails and installing the remaining mechanism for operation of the locks below the floor of the aircraft. The operating mechanism incorporates a simultaneous control used for logistics and a sequential control used for aerial delivery and combat off-loading. A non-destructive type of load-sensing mechanism is used for aerial delivery to eliminate the need for replacing a bending fuse. Adjustments to the load-sensing mechanism afford retention of a pallet in its proper position until a predetermined load is applied to the pallet by an extended parachute. The operating mechanism is integrated with cargo restraint rails which fold into the floor when not in use. The locks used for forward and aft restraints of cargo are located in one rail and the remainder of the mechanism is located below the floor. The locks are remotely controlled from a loadmaster station and locally controlled at each lock. A cable system is used to transmit control motion simultaneously to all the locks for logistics and a control roller link chain is used to transmit control motion for indexing each lock according to their sequential arrangement along the rail. The latter operation of the locks is used for combat off-loading and aerial delivery where the cargo is extracted in flight by the force of a parachute. Moreover, the aerial delivery mode of operation is accompanied by the operation of a mechanical fuse integrated into the system to release a cargo lock after deployment of the main parachute.

More specifically, according to the present invention, there is provided a cargo restraint and delivery system comprising a pair of parallel guide rails for cargo-carrying pallets extending longitudinally along a floor of an aircraft which has a cargo-receiving and delivery opening, a single one of the rails at spaced points therealong being provided with pallet locks for releasably engaging pallets to hold them in position along the guide rails, a logistics control means coupled to simultaneously move the pallet locks into a first position where the pallet locks will release pallets for movement either forward or aft of the aircraft and a second position where the pallet locks will prevent either forward or aft movement of a pallet, a system of levers coupled to each of the locks, and a cargo-delivery control system including cam means for sequentially actuating each system of levers to move the pallet locks along the rail into third and fourth positions where the locks will prevent forward movement of a pallet but will permit aft movement of a pallet by movement of a lock against a biasing force of a spring acting on the lever system thereof where the lock remains disengaged and where the locks will prevent forward movement of a pallet but will permit free aft movement where the lock is capable to reengage for preventing forward movement of a pallet, respectively.

These features and advantages of the present invention as well as others will be more fully understood when the following description is read in light of the accompanying drawings, in which:

FIG. 1 is a schematic illustration of a cargo plane with which the present invention may be utilized;

FIG. 2 is a perspective view of two cargo restraint rails for pallets loaded onto an aircraft of the type shown in FIG. 1;

FIG. 8 is a sectional view taken along line VIII—VIII of FIG. 6;

FIG. 9 is a sectional view taken along line IX—IX of FIG. 8; and

Figure 3:
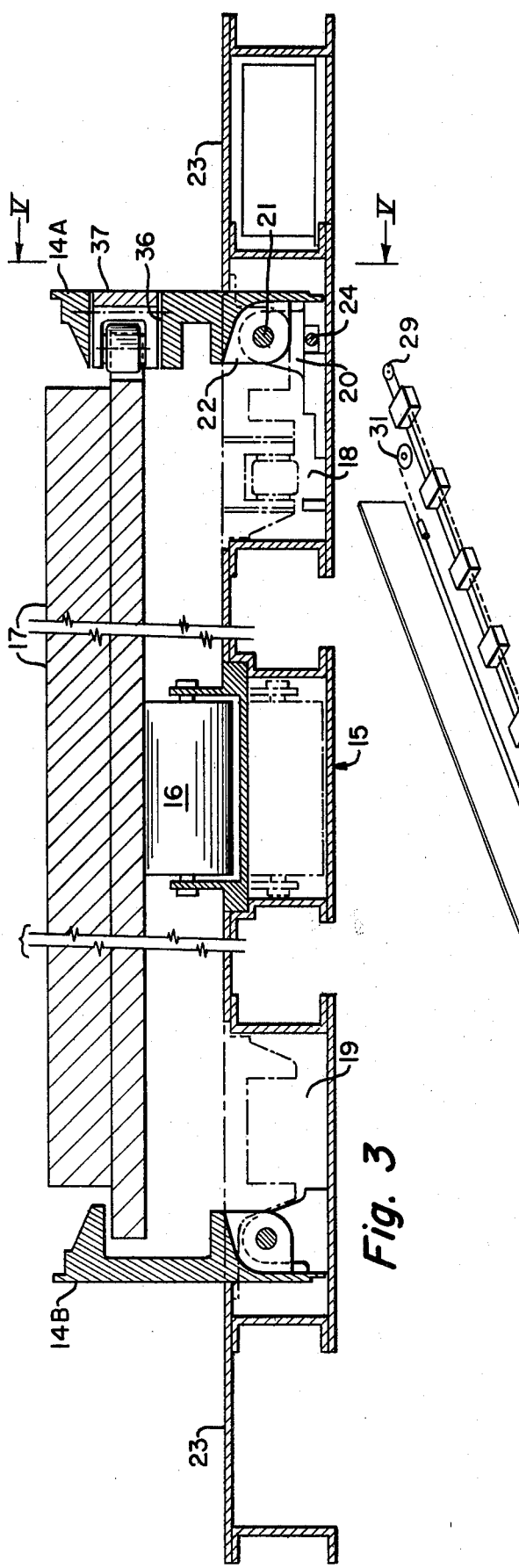
FIG. 3 is a cross-sectional view of the apparatus shown in FIG. 2.

With particular reference now to FIG. 1 of the drawings, there is shown a cargo plane identified by reference numeral 10 and provided on its underside with a cargo-receiving and delivery opening 11 and a ramp 12. Cargo within the aircraft 10 is identified by reference numeral 13 and is carried on pallets which are adapted to travel backwardly on restraining guideways or tracks generally indicated by reference numeral 14. Cargo can be discharged from the aircraft with the ramp 12 in the open position by causing a parachute, attached to the cargo on each pallet, to be released to slip into the stream below and behind the aircraft. Before the parachute is dereefed and expanded into its full drag and mode suspension area, the cargo on each pallet should be restrained and prevented from movement. However, once the full drag force of the parachute is exerted on the cargo, it should break away from the guide rails 14 and move backwardly through the opening 11. This mode of operation is referred to as the aerial delivery mode.

It is sometimes necessary or desirable to unload the cargo on the pallets while the aircraft is taxiing on the ground and accelerating. In this mode, called the combat off-load mode, the pallets are restrained against forward movement but must be free to move aft of the aircraft. In still another mode of operation, called logistics, pallets are loaded onto the aircraft and locked between the guide rails 14 so that they can move neither forward nor aft of the aircraft during normal flight.

A typical pallet is identified by reference numeral 17 in FIGS. 2 and 3 while guide rails are identified by reference numerals 14A and 14B. The two guide rails are interconnected by an aircraft floor structure 15 provided with rollers 16 on which the pallets 17 can move. Formed in the floor structure 15 are two troughs 18 and 19 each having a plurality of upstanding brackets 20 spaced along their lengths. The brackets 20, in turn, are connected through a hinge pin 21 to brackets 22 on the guide rails so that the guide rails can pivot from the upright position shown to the horizontal, dotted-line position shown in FIG. 3, and rollers 16 are inverted, so that all top surfaces are essentially flush with the upper surface 23 of the floor structure 15. Both guide rails pivot in this manner and it will be appreciated that when the aircraft is carrying no palletized cargo, the rails are rotated downwardly into the horizontal, dotted-line position and the rollers are inverted so as to eliminate any discontinuities in the floor surface.

Figure 4:
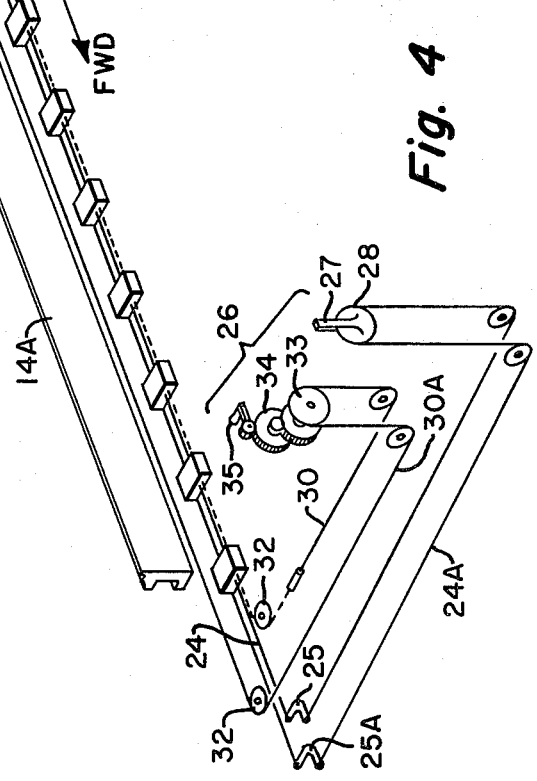
FIG. 4 is a perspective view of the operating systems for restraint and delivery of cargo according to the present invention.

Extending along the entire length of the guide rails 14A at the bottom thereof is an actuator cable 24 to move backwardly or forwardly along a direction generally parallel with the extended length of the rail. As shown in FIG. 4, the cable passes about a lever mechanism 25 at a forwardly-spaced relation from the end of the rail from where it extends to a loadmaster station 26. A lever arm 27 is coupled to a drive pulley 28 about which cable 24 extends to form a return run of the cable identified in FIG. 4 by reference numeral 24A. The return run of the cable extends about a lever mechanism 25A and thence along the entire length of the rail 14A to the aft end thereof where a reversing pulley 29 supports the cable. Extending along a similar course is a roller link chain with an actuator control run identified by reference numeral 30 and a return run identified by reference numeral 30A. At the aft end of the rail, a reversing sprocket 31 supports the chain and spaced forwardly from the forward end of the rail, sprockets 32 direct the chain to a drive pulley 33. Pulley 33 is coupled to the output shaft of a speed reducer 34 wherein a train of gears is coupled to a drive gear on a crank handle 35. The crank handle 35 produces a control motion in the chain coupled thereto for pallet locks spaced along guide rail 14A. This control motion forms a sequence of control commands to index each lock for combat off-loading and aerial delivery. The lever 27 is used to produce a control motion in the cable coupled thereto for simultaneous control of all locks as required for aerial delivery, combat off-load or logistics. Moreover, as will be described hereinafter, the pallet locks are locally controlled for logistics at each lock.

Figure 5:
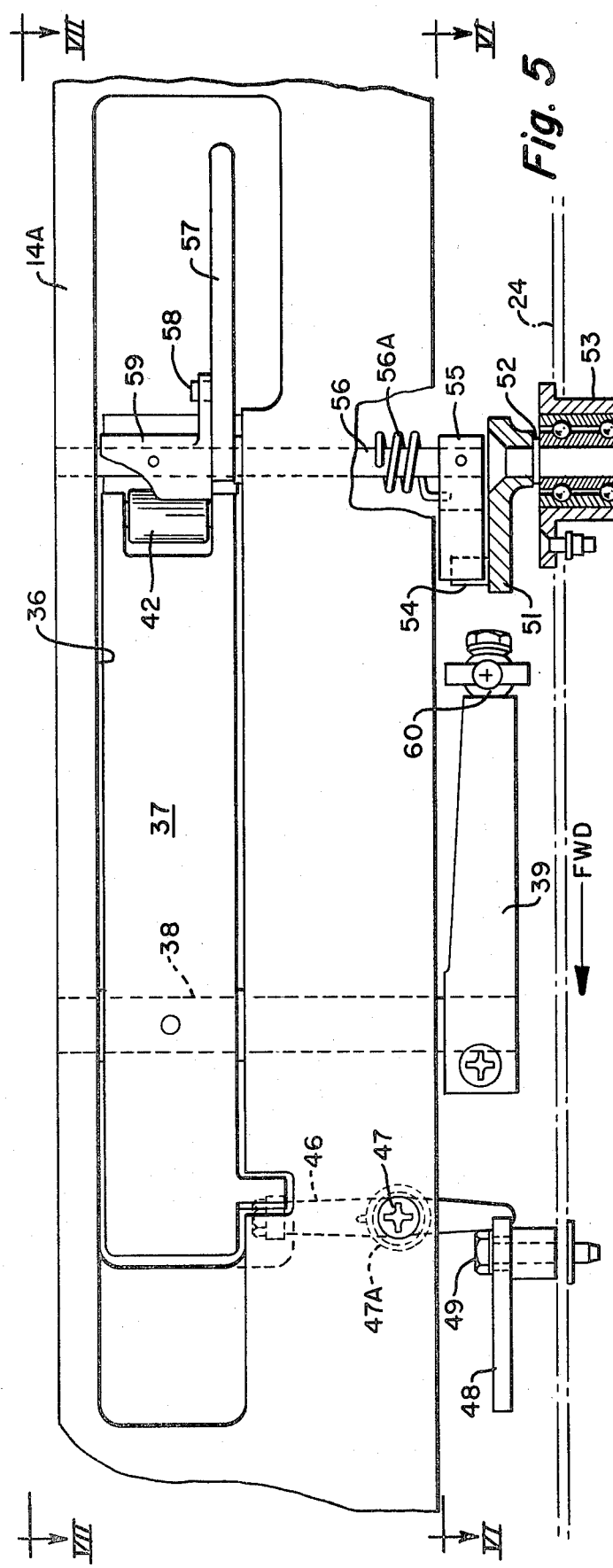
FIG. 5 is an enlarged elevational view taken along line V—V of FIG. 3.
Figure 7:
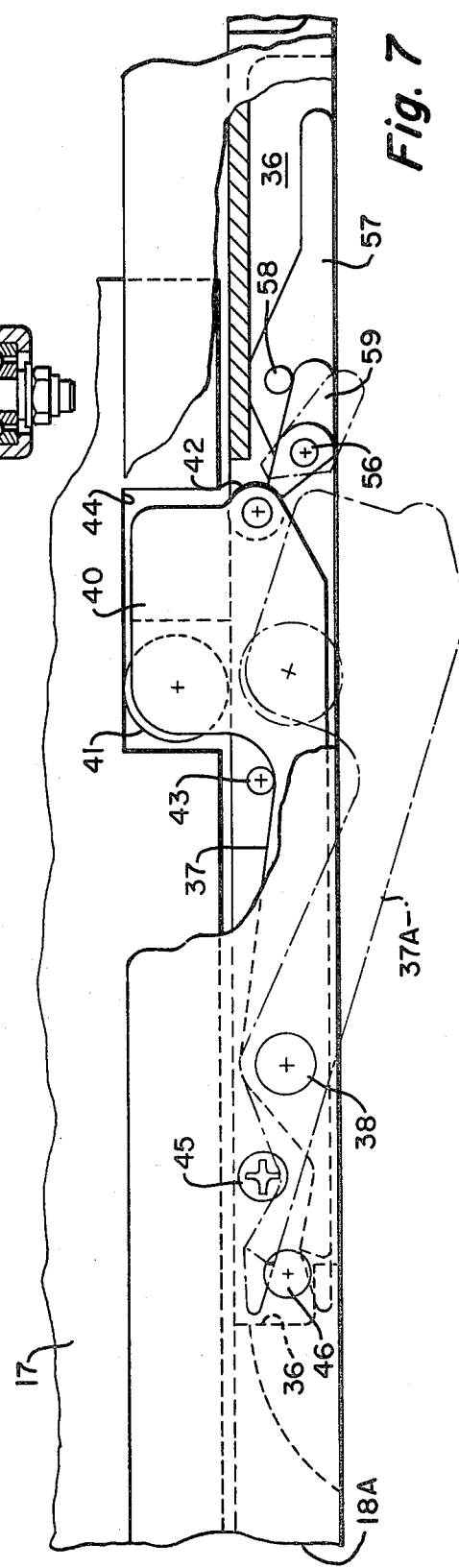
FIG. 7 is a plan view of a restraint rail taken along line VII—VII of FIG. 5.

The guide rail 14A is provided along its length with a series of openings 36 that are spaced apart on the rail such that an opening 36 is adjacent each of the respective pallets. Pivotally carried within each opening is a pallet lock in the form of a teeter 37. As best shown in FIGS. 5 and 7, the teeter 37 is supported at one end portion for pivotal movement by a vertically-extending pivot shaft 38 that projects from the bottom surface of the rail where a lever 39 is clamped and splined onto the projected end portion of the shaft. The teeter can pivot about shaft 38 from a locking position shown in FIG. 7 to a withdrawn position, shown by phantom lines and identified by reference numeral 37A. The body portion of teeter 37, at its end portion opposite the portion engaged by shaft 38, has a laterally-projecting lock section 40 with a hollowed-out area wherein a roller 41 is supported by a shaft. The end portion of the teeter is also formed with a hollowed-out portion wherein a roller 42 is supported by a shaft. A stop pin 43 extends vertically in the guide rail within opening 36 to fix the inboard pivotal position of the lock section 40 of the teeter so that the projection including roller 41 fits into a slot or notch 44 formed in a flange of a pallet 17. At the opposite end of the teeter there is a stop pin 45 that contacts a tail section projecting laterally from the teeter within the slot 36 when the teeter is moved to the retracted position 37A (FIG. 7). A pivotally-mounted, spring-biased pawl 46 pivots within a plane of the extended length of the rail about a perpendicularly-arranged anchor pin 47. The pawl projects from the bottom of the rail where the exposed end portion thereof moves when actuating lever 48 is brought into contact therewith. A pivot pin 49 supports one end of lever 48 from the floor plate 18A forming part of the trough 18. The free end of lever 48 is attached to one end of a connecting rod 50 and the opposite end of rod 50 is connected to the midportion of a control lever 51. The end portion of lever 51 is secured to the actuator cable 24. The control motion supplied by the actuator cable pivots the control lever 51 about a pivot shaft 52 supported by a bearing mounting assembly 53 mounted on the floor plate 18A. The control lever 51 carries an upstanding pin 54 that is loosely received within the opening at the forked end of a control arm 55. A pivot shaft 56 spring-biased counterclockwise by spring 56A for pivotal movement supports the control arm. Shaft 56 extends upwardly through an opening in the guide rail to the recess 36 where the manual lock release lever 57 pivots freely about shaft 56. Lever 57 has an upstanding pin 58 at one end which can move locking lever 59, which is pinned to pivot shaft 56, clockwise. The locking lever in the position shown in FIG. 7 engages roller 42 of the teeter when it is in a pallet-locking position. The phantom-line position of locking lever 59 permits the teeter to move about pivot pin 38 outwardly from locking engagement with a pallet.

As described previously, rails 14A and 14B are mounted for pivotal movement from the upright position shown in FIGS. 2 and 3 to the horizontal, dotted-line position shown only in FIG. 3. The interconnection for the structure controlled by cable 24 and the pawl 46 and shaft 56 is separable. In this regard, adjusting lever 48 is simply brought into contact with pawl 46 of each lock while pin 54 and control arm 55 form a separable connection for pivot shaft 56.

Figure 6:
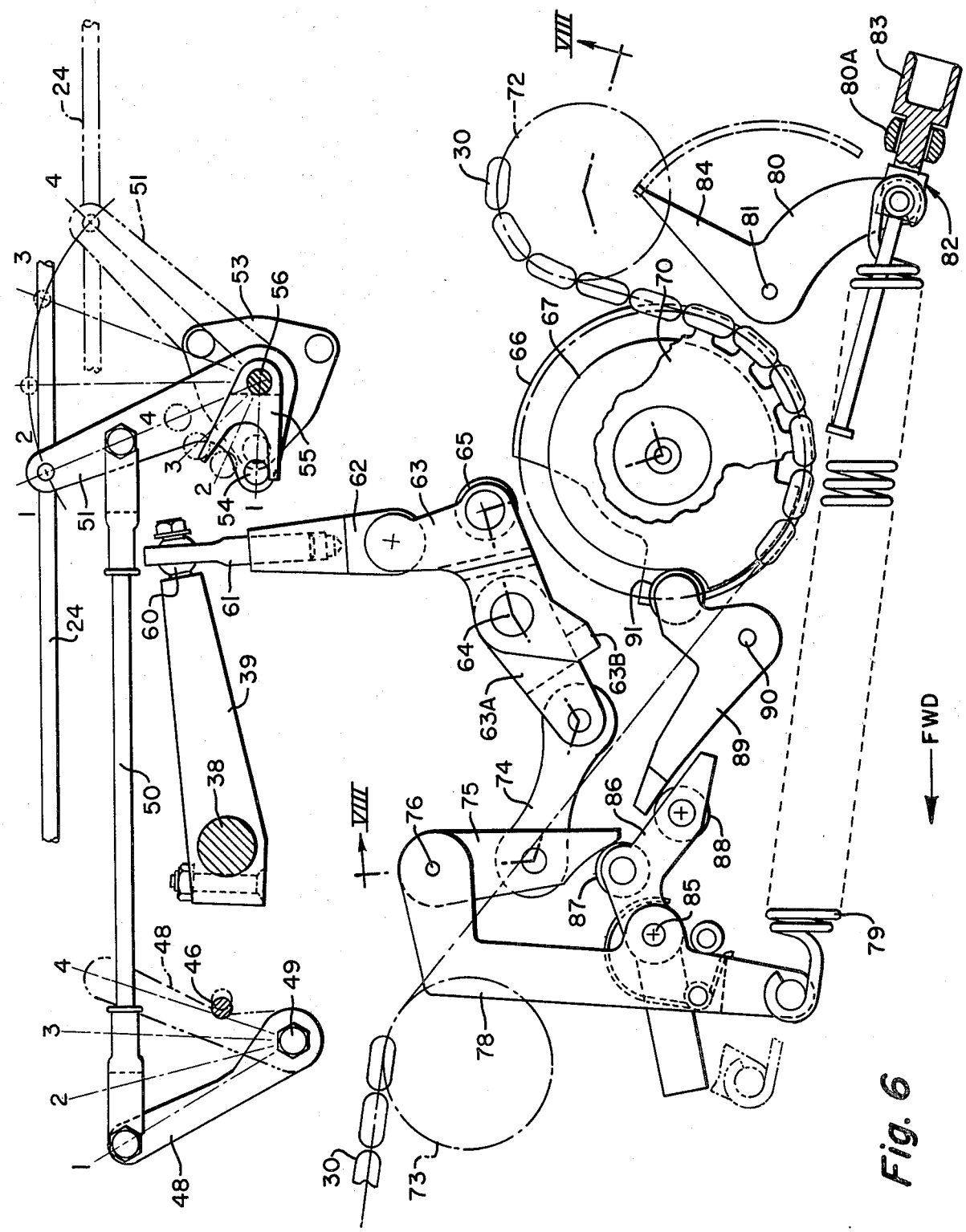
FIG. 6 is a sectional view taken along line VI—VI of FIG. 5 to illustrate the preferred form of a linkage assembly for the system of the present invention.
Figure 10:
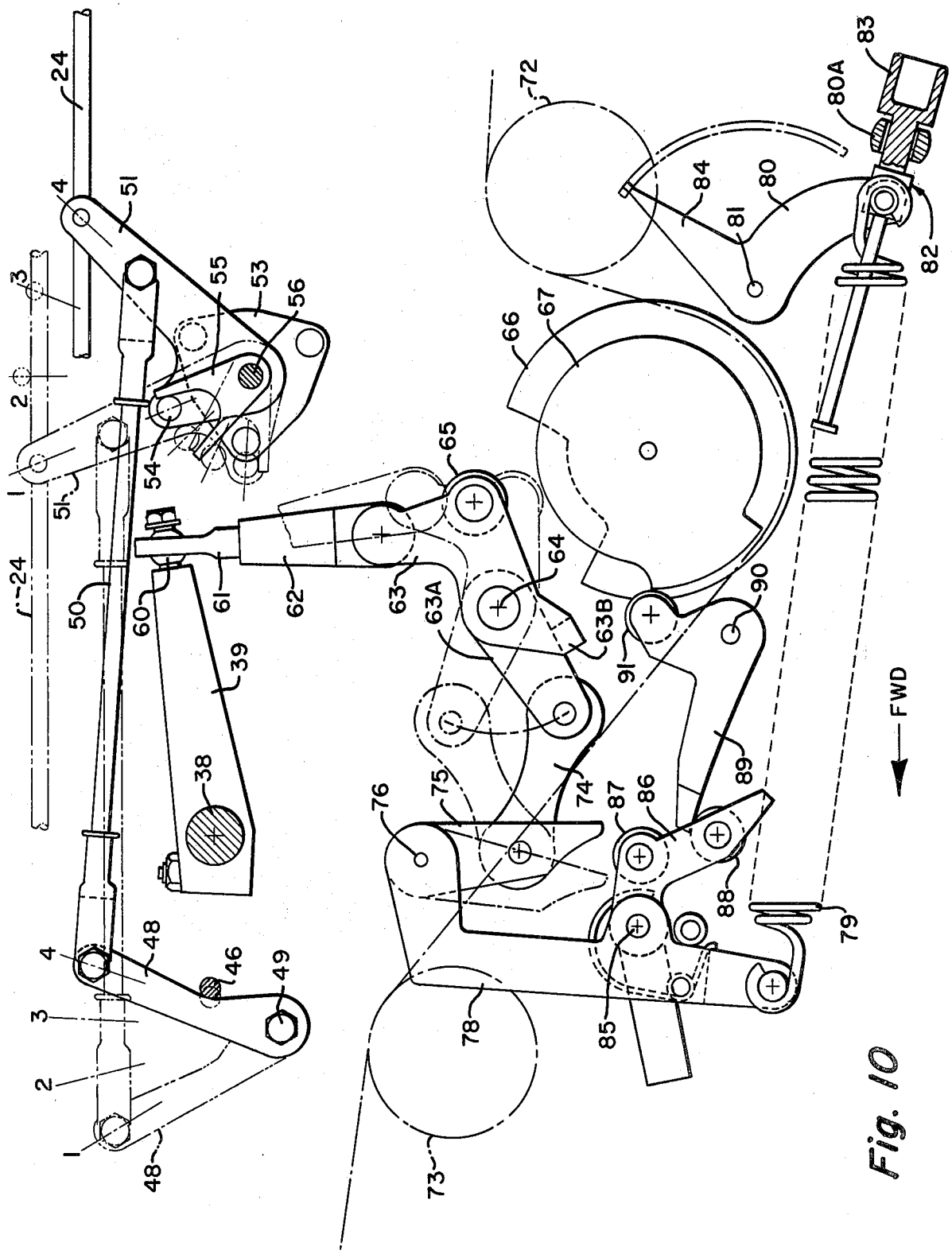
FIG. 10 is a sectional view similar to FIG. 6 but illustrating the position of the linkage assembly for combat off-loading and emergency release of cargo.

Pivot arm 39 carries a uniball bearing 60 having its center located on the center line of hinge pin 21. The uniball bearing is connected to a system of levers and cams used for controlling movement of the teeter in response to control movement provided by chain 30. The uniball bearing, in the form shown in FIG. 6, includes a spherical ball member attached by a pin to the arm and banjo 61. The banjo has a threaded end attached to a link 62 carried by a pivot pin on a cam roller carrier 63. The carrier is supported by a shaft 64 carried by spaced-apart support plates forming a frame that is, in turn, supported by the floor plate 18A of trough 18. Carrier 63 supports a follower plate 65 for contact with the surface of a sequential lock cam 66. Shaft 64 also supports lever 63A which freely moves about shaft 64. Clockwise rotation of carrier 63 about shaft 64 is transmitted to lever 63A through stop 63B on the carrier. As shown in FIG. 8, the cam 66 is formed as an integral part of a mounting hub that also supports an emergency release cam 67. The hub for the cams is connected through a torsion spring and mechanical stops to a drive shaft 68 that is supported at its opposite ends by bearings and coupled to an indexing disc 69. A sprocket wheel 70 has a series of threaded openings; any one of which can receive a threaded fastener 71 passed through an alignable opening in the indexing disc 69 which allows individual indexing at each pallet lock. Rotation of the cams occurs in response to control motion supplied by a chain 30 which, as shown in FIG. 6, is trained about the sprocket wheel 70 and spaced-apart idler sprockets 72 and 73.

Returning now, to carrier 63, the preferred form of linkage system according to the present invention further provides that lever 63A is connected by a pivot pin to one end of toggle link 74. Link 74 is connected at its other end by a pivot pin to the midportion of a release lever 75. The release lever is supported by a shaft 76 carried by the plates 77 (FIG. 8) of the frame in the same manner as described in regard to shaft 64. Shaft 76 also supports a lever arm 78 that is coupled to one end of a tension spring 79. This spring is connected at its free end to a lever arm 80 supported by a pivot pin 81 in the same manner already described in regard to pin 64. The interconnection between lever 80 and spring 79 is accomplished through an adjustable spring tensioner nut 82 having an adjusting shaft grounded to plate 77 by member 80A with a knurled knob 83 for varying the force imposed by spring 79 on lever 78. A load-setting indicator arm 84 moves along a suitable scale on the mounting frame, i.e., upper plate 77, to provide a visual indication of the necessary release force that must be imposed by the cargo upon the lever system via the teeter 37 for delivery of cargo.

Lever 78 carries a pivot shaft 85 by which it supports an actuating lever 86 having a manual control handle at one end and spaced-apart rollers 87 and 88 at its opposite end. Roller 87 can contact a cam surface on the end of lever arm 75. Roller 88 contacts an arm portion of an emergency release lever 89 that is supported by a shaft 90 in the same manner previously described in regard to shaft 64. Lever 89 supports a follower roller 91 for engagement with cam 67.

The operation of the cargo restraint and release mechanism can best be understood by reference to FIGS. 4–10 in light of the following description. The cable system transmits control motion simultaneously to all locks. Lever 27 is moved to one of four detented positions which produces linear displacements of cable 24 identified in FIG. 6 as (1) LOCK-SAFE, (2) SPRING-LOCKED, (3) UNLOCKED, COMBAT OFF-LOAD and (4) UNLOCKED, AERIAL DELIVERY. Moreover, in the logistics mode of operation, emergency release lever 89 is moved by the cam 67 in a counterclockwise direction (FIG. 6) which moves lever 86 and roller 87 out of engagement with lever 75 whereby lever 63A and toggle link 74 are free to move to the dotted-line position without extending spring 79 or moving carrier 63. Rotation of the sequence control crank causes the cam 66 to move to the position where carrier 63 can rotate clockwise without contacting the cam surface. Crank 39 and teeter 37 can now be freely moved clockwise by overcoming the force imposed by bias spring 56A. When the control lever 27 at the loadmaster station is placed to position (4), i.e., UNLOCKED, AERIAL DELIVERY, the control cable pivotally moves the lever 51 of each pallet lock. However, movement of lever 48 by the control rods 50 is only by a degree of advancing movement such that it still does not contact spring-biased pawl 46 but the locking lever 59 remains at a position which allows the teeter to move to the dotted-line position shown in FIG. 7. The spring-biased pawl 46 prevents the counterclockwise movement of the spring-biased teeter to return to the spring-biased position 37 shown in FIG. 7. The control lever at the loadmaster control station is then moved to position (2), SPRING-LOCKED, correspondingly positioning the control lever 51 and adjusting lever 48. The control lever 55, which is spring-biased counterclockwise, moves from the phantom position to the solid-line position. A cargo platform is then moved in place with the teeter at position 37A so that the notched opening 44 aligns with the projection 40 whereupon the teeter is moved to the position 37 shown in FIG. 7. The locking lever 59 will snap to the solid-line position shown in FIG. 7. In this position, the locking lever 59 can be rotated clockwise via lever 57 manually at each lock to unlock the teeter. For in-flight operation of the system, the control at the loadmaster station is moved to position (1), LOCK-SAFE, whereby pins 54 and 58 prevent the locking lever 59 to move in any direction.

In the aerial delivery mode of operation, the spring 79 is used as a variable load-sensing member. Loading of the platforms between the rails is carried out in the same manner as already described for the logistics mode of operation. To engage and adjust the load-sensing mechanism in the lever system acted on by spring 79, the lever 86, spring-biased counterclockwise, is moved clockwise via the control handle out of engagement with lever 75 and held in that position until lever 63A is moved to the solid-line position shown in FIG. 6, and by adjusting the member 83, the tension imposed by the spring on lever 78 is adjusted as required. The indexing disc 69 coupled between the sprocket 70 and the shaft 68 which supports the cam is used to rotatably position the cams to the required sequence. For the locks which are engaged in the aft-most platform, the cam is positioned so that the radial lobe is immediately adjacent the roller 65. For delivery in flight, lever 51 is moved by the cable operation at the loadmaster station to the UNLOCKED, AERIAL DELIVERY, position (4). The surface of cam 66 acts as a lock by preventing lever 63 from moving clockwise. Turning the loadmaster crank 35 once rotates cam 66 to a position where the deployment of a parachute develops the load on the cargo and lever system to overcome the force of spring 79 acting on lever 86 and thereby permitting clockwise rotation of teeter 37. Should the force developed be insufficient to overcome the spring force, the loadmaster turns the crank 35 one more turn which rotates the emergency release cam into a position where the radial lobe section contacts and actuates the emergency release lever 89 by displacing the follower 91 in a direction to rotate lever 89 counterclockwise and disengage lever 86 from lever 75. The cargo can now be moved aft without overcoming the spring force that is developed on this lever system by spring 79. To release the next platform, the teeter for the cargo lock at this location is controlled by cam 66. At this location, the position of the lobe of cam 66 lags behind the lobe of the cam at the next aft lock. This relation is produced by positioning the cam 66 by the use of the indexing disc so that it lags in rotation from the emergency release lever by an amount corresponding to two turns of the crank 35. Such adjusted positioning of the cams occurs prior to flight. The loadmaster operates the controls through the same sequence of operation for each platform. A predetermined number of platforms can be in this manner sequentially released. After release of a cargo platform, the teeter 37 remains at the dotted-line position 37A (FIG. 7) to allow the platforms at forward locations to move along the guide rails without obstruction.

For the combat off-load mode of operation, the pressure-sensing mechanism is not used whereby the force developed by spring 79 is isolated from the teeter by operation of the linkage system. This is accomplished by moving lever 63A and toggle link 74 to the dotted-line position indicated in FIG. 10. The control lever 27 is operated, thereby moving actuator cable 30 to displace the control lever 51 about its pivot shaft to the UNLOCKED, COMBAT OFF-LOAD, position (3), identified in FIGS. 6 and 10. This movement of the lever causes rotation of lever 55 and also lever 59 to the dotted-line position (FIG. 7). In this position of lever 59, the teeter is unlocked. The sequential locking disc 66 is maintained at a position which insures that the follower roller 65 contacting the disc maintains the lever arms coupled thereto in a position so that the teeter cannot move from a locked position in which the roller 42 and projection 40 extend into the notch in the side of a pallet. Pawl arm 46 (FIG. 10) is moved to a displaced position where it is held there by the lever 48. The teeter is free to return to its dotted-line position 37 as shown in FIG. 7 after the platform has been released. The teeter acts in this manner as a ratchet allowing the platforms to move in a direction only aft of the aircraft for emergency release of cargo. The release of the individual platforms is identical to the aerial delivery mode of operation described above except that the emergency release function is not needed for the combat off-load mode of operation. It is to be understood that the pallets are loaded onto an aircraft according to the logistics mode of operation described above and that the sequential arrangement of lobes for the cams is established prior to the combat off-load mode of operation.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. A combined cargo delivery and logistics cargo restraint system comprising a pair of parallel guide rails for cargo-carrying pallets extending longitudinally along a floor of an aircraft which has a cargo-receiving and delivery opening, a single one of said rails at spaced points therealong being provided with pallet locks for releasably engaging pallets to hold them in positions along the guide rails, a logistics control means coupled to simultaneously move the pallet locks into a first position where said pallet locks will release pallets for movement either forward or aft of the aircraft and a second position where said locks will prevent either forward or aft movement of a pallet, a system of levers coupled to each of said locks, and a cargo-delivery control system including cam means for sequentially actuating each system of levers to move the pallet locks along the rail into a third position where the locks will prevent forward movement of a pallet but will permit aft movement of the pallet by movement of a lock against a biasing force of a spring acting on the lever system thereof; wherein each system of levers includes an actuator arm coupled by a uniball joint to a control arm, and a pivot shaft supported by a single one of said rails to interconnect said control arm and a pallet lock, and wherein said system further includes troughs formed in said floor of the aircraft, and means mounting said guide rails for pivotal movement from positions where they extend upwardly from the floor to positions where they are rotated downwardly into the troughs and form a flush surface with the remainder of the aircraft floor.

2. The system according to claim 1 wherein said pallet locks each includes a teeter pivotally supported at one end portion by a pivot on the single one of said rails, and a pawl to restrain said teeter for engagement with a pallet.

3. The system according to claim 2 wherein said teeter further includes a roller means to engage in a notch in the side of a pallet.

4. The system according to claim 2 wherein said logistics control means includes an actuator cable coupled to each of said pawls to restrain the teeters in either of a retracted or engaged relation with pallets.

5. The system according to claim 2 further including a locking lever for each teeter on the single one of said rails to move into a locking position and into an unlocking position with the other end of teeter.

6. The system according to claim 5 wherein said logistics control means includes an actuator cable coupled with control levers each pivotally supported by the single one of said rails for a pallet lock, and a spring-biased mechanism interconnecting a control lever with a respective locking lever.

7. The system according to claim 6 further comprising actuating levers each pivotally supported by the single one of said rails for controlling movement of said pawl, and a connecting rod to interconnect each actuating lever and control lever for synchronous movement by said actuator cable.

8. The system according to claim 1 wherein each system of levers includes a support frame below a floor at the one side of the single one of said rails.

9. The system according to claim 1 wherein said cargo-delivery control system includes an actuating member coupled to drive a cam member of cam means for each system of levers, the cam members for successive pallet locks along the rail being arranged to sequentially actuate the pallet locks into said third position.

10. The system according to claim 9 further including a control drive means remote to said rails to drive said actuating member.

11. The system according to claim 1 further including means to adjustably select the magnitude of the force imposed by said spring on said lever system.

* * * * *